United States Patent [19]

Meyerle

[11] Patent Number: 4,895,050
[45] Date of Patent: Jan. 23, 1990

[54] BRANCHED INFINITELY-VARIABLE HYDROMECHANICAL TRANSMISSION FOR MOTOR VEHICLES

[76] Inventor: Michael Meyerle, Kiefernweg 9, D-7996 Meckenbeuren-Lochbrucke, Fed. Rep. of Germany

[21] Appl. No.: 86,625
[22] PCT Filed: Sep. 17, 1986
[86] PCT No.: PCT/DE86/00370
§ 371 Date: Jul. 16, 1987
§ 102(e) Date: Jul. 16, 1987
[87] PCT Pub. No.: WO87/01782
PCT Pub. Date: Mar. 26, 1987

[30] Foreign Application Priority Data

Sep. 18, 1985 [DE] Fed. Rep. of Germany ....... 3533193

[51] Int. Cl.$^4$ ............................................. F16H 47/04
[52] U.S. Cl. ................................................ 74/687
[58] Field of Search .......................... 74/687, 681, 677

[56] References Cited

U.S. PATENT DOCUMENTS

| | | | |
|---|---|---|---|
| 3,855,879 | 12/1974 | DeLalio | 74/687 |
| 3,979,972 | 9/1976 | Sakai et al. | 74/687 |
| 4,164,156 | 8/1979 | Reed | 74/687 |
| 4,232,568 | 11/1980 | Maeda | 74/687 |
| 4,286,477 | 9/1981 | Meyerle et al. | 74/687 |
| 4,291,592 | 9/1981 | Meyerle et al. | 74/687 |
| 4,304,151 | 12/1981 | Meyerle et al. | 74/687 |
| 4,306,467 | 12/1981 | Pollman | 74/687 |
| 4,341,131 | 7/1982 | Pollman | 74/687 |
| 4,373,359 | 2/1983 | Ehrlinger | 74/687 |
| 4,382,392 | 5/1983 | Meyerle et al. | 74/687 |
| 4,434,681 | 3/1984 | Friedrich et al. | 74/687 |
| 4,485,691 | 12/1984 | Reed | 74/687 |

FOREIGN PATENT DOCUMENTS

| | | |
|---|---|---|
| 0081696 | 6/1983 | European Pat. Off. . |
| 2412760 | 7/1979 | France . |
| 2049843 | 12/1980 | United Kingdom . |

*Primary Examiner*—Dwight G. Diehl
*Attorney, Agent, or Firm*—Staas & Halsey

[57] ABSTRACT

Infinitely variable hydromechanical transmission with multiple power-transmission paths for motor vehicles having at least two gear-shift ranges, in which the infinitely variable control of the transmission is effected by a hydrostatic transmission. The transmission system manages with fewer hydrostatic units than heretofore. Its power-to-weight ratio and volume are lower. Its efficiency is increased six to ten times compared to a hydrostatic transmission. A hydrostatic package, a summation planetary gear train, and a second planetary gear train form the basic units which are constantly interconnected in any combination of transmissions. Depending on the range shifted, clutches connect the output shaft to one of the shafts of the summation planetary gear train or to a shaft of the second planetary gear train.

17 Claims, 8 Drawing Sheets

BRANCHED INFINITELY-VARIABLE HYDROMECHANICAL TRANSMISSION FOR MOTOR VEHICLES

The invention relates to an infinitely variable hydromechanical transmission with multiple power-transmission paths for motor vehicles and having at least two gear-shift ranges in which the infinitely variable control of the transmission is affected by a hydrostatic transmission.

A transmission with multiple power-transmission paths for motor vehicles is taught by German Pat. No. 28 54 375. However, this transmission is limited to a relatively low power range or requires fairly large hydrostatic units.

The object of this invention is to create a transmission system which manages with smaller hydrostatic units, whose power-to-weight ratio and volume are reduced and which achieves a high degree of overall economy, in particular by its extensive adaptability to various vehicle-specific conditions, while allowing for an easy-to-produce design, generally low production costs, and realizability of modular methods of production.

According to this invention, this object is achieved as follows:

Owing to the type of transmission system with multiple power-transmission paths incorporating the invention versus a pure hydrostatic transmission, the efficiency is increased six to ten times, depending on the form of construction and vehicle conditions (degree of power increase corresponds to the marginal-power factor $f_E$). This reduces substantially the power-to-weight ratio and the volume or the size of hydrostatic units, as the case may be. Technically speaking, the high speeds, e.g. in a passenger car, can only be handled, with small hydrostatic units. That means that the high power requirements of fairly large passenger cars call for systems with a correspondingly high power volume in spite of the small hydrostatic units, i.e., with a correspondingly high degree of power increase or marginal-power factor, as the case may be. In the aforementioned system taught by German Patent DE-PS No. 28 54 375, the efficiency can be increased four times compared to that of hydrostatic units, while allowing for a back-up speed acceptable for passenger cars. Consequently, compared to the invention, considerably large hydrostatic units are required.

All specific embodiments shown in FIGS. 1 through 10 are based on the same fundamental system. Using the basic modules of hydrostatic units, planetary gear train 10; 110; 210 and second planetary gear train 11; 111, it is possible to make different combinations of transmissions. All these modules are in constant mesh with each other. Depending on the range shifted, the clutches 12; 112 connect the output shaft to one of the shafts of the summation planetary gear train 10 or 100; 210, as the case may be, or to one shaft of the second planetary gear train 11; 111.

In accordance with the broader aspects of the invention, the invention provides an infinitely variable hydromechanical transmission mechanism having a power input shaft, a power output shaft and multiple path power-transmission means for transmitting power in at least two speed ranges from the input shaft to the output shaft. In particular the transmission mechanism comprises hydrostatic drive means connected to the power input shaft and including a first hydrostatic unit and a second hydrostatic unit having a hydrostatic power outlet. The mechanism also includes a four-shaft summation planetary gear train having a first shaft connected to the input shaft, a second shaft connected in constant driving relationship to the hydrostatic power outlet, a third shaft and a fourth shaft. First clutch means is provided for selectively drivingly connecting the third shaft and the output shaft and second clutch means is provided for selectably drivingly connecting the fourth shaft and the output shaft. The mechanism also includes a three shaft planetary gear train having a shaft that is connected to either the second shaft or the third shaft of the four-shaft planetary gear train.

In accordance with a more specific aspect of the invention, the summation gear train may comprise a double planetary gear train having two intermeshed planet gears. In accordance with this aspect of the invention, the first shaft includes an internal gear, the second shaft includes a sun gear, the third shaft includes a planet carrier mounting the intermeshed planet gears and the fourth shaft includes a sun gear. One of the intermeshed planet gears is in operable engagement with both the internal gear of the first shaft and the sun gear of the second shaft. The other of the intermeshed planet gears is in operable engagement with the sun gear of the fourth shaft.

The invention also provides an infinitely variable hydromechanical transmission mechanism having a power input shaft, a power output shaft and multiple path power-transmission means for transmitting power from the input shaft to the output shaft. In this regard, the mechanism may comprise hydraulic drive means including a first hydrostatic unit with adjustable volume and a second hydrostatic unit having a hydrostatic power outlet. A four-shaft summation planetary gear train is included for adding together hydraulic and mechanical power. The summation planetary gear train includes first, second, third and fourth shafts. The input shaft is permanently drivingly connected to the hydrostatic drive unit and to the first shaft of the four-shaft gear train and the second shaft is permanently connected to the hydrostatic power outlet. A three-shaft planetary gear train is provided. The three-shaft gear train includes a shaft that is connected to either the second shaft or the third shaft of the summation gear train. In this aspect of the invention the mechanism also includes clutch means comprising at least two clutches for selectively and alternatively connecting the third and fourth shafts of the summation gear train to the output shaft.

In accordance with an important aspect of the invention the clutches may be arranged in a common, compact clutch assembly or clutch module.

In most hydrostatic units with identical construction, vehicle-oriented adaptability to different vehicle-specific conditions is provided to a large degree, both in terms of the necessary efficiency and the installation conditions. The accompanying drawings will explain the corresponding expedients, in which.

Figure 1:
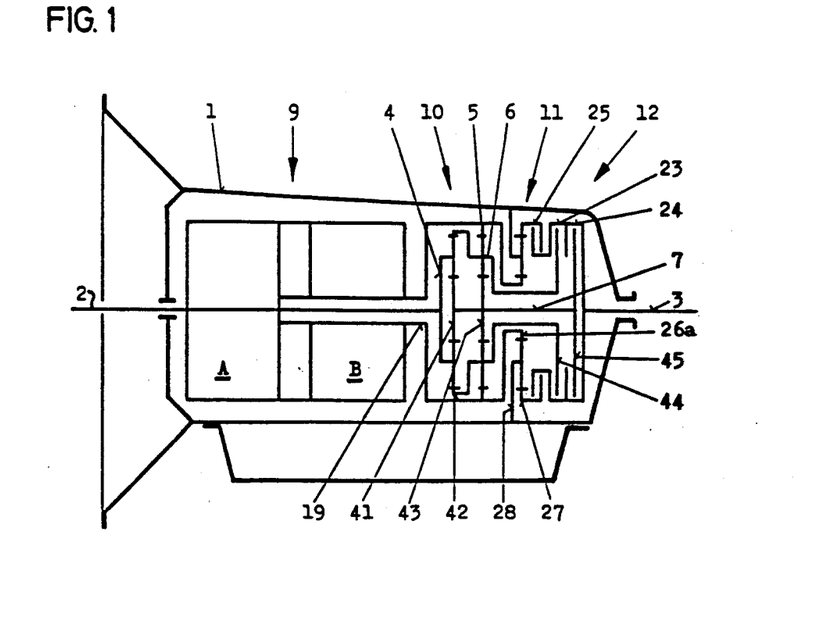
FIG. 1 is a specific embodiment with three forward ranges, with the reverse range and the first forward range operating purely hydrostatically, and the second and third ranges hydromechanically.

The specific embodiment shown in FIG. 1 consists of a transmission with coaxial arrangement of all basic units: hydrostatic transmission, summation planetary gear train 10, second planetary gear train 11, and the clutches 12 mounted on the driven end. This transmission has three forward ranges, the first forward range and the reverse range operating purely hydrostatically. In the first range, the power is transmitted via the second hydrostatic unit B directly to the sun gear 26a of the second planetary gear train 11 and its internal gear 27 via the closed clutch 25 to the output shaft 3.

As shown, summation planetary gear train 10 is a four-shaft gear train and planetary gear train 11 is a three-shaft planetary gear train. The first shaft of gear train 10 consists of planet carrier 4, the second shaft consists of an internal gear 5 on hydrostatic power outlet 19, the third shaft consists of planet carrier 6 and the fourth shaft 7 carries sun gears 41 and 43. The three-shaft planetary gear train 11 includes a first shaft consisting of sun gear 26a, a second shaft presented by planet carrier 28 and a third shaft consisting of internal gear 27. The clutch assembly 12 includes clutch 25 arranged to selectively interconnect internal gear 27 and output shaft 3, clutch 23 for selectively connecting planet carrier 6 and output shaft 3, and clutch 24 for selectively coupling shaft 7 and output shaft 3.

In the second and third ranges, the power is divided at the transmission input into a hydraulic power-transmission path and a mechanical power-transmission path. The mechanical power flows via the plate carrier 4, and the hydraulic power, via the first hydrostatic unit A with adjustable volume to the second hydrostatic unit B with preferably constant volume, to the internal gear of the summation hydraulic power and the mechanical power are added together at the planet carrier 6, and both powers flow via the closed clutch 23 to the output shaft 3. In the third range, the power summated in the summation planetary gear train is transmitted to the output shaft 3 via the shaft 7, with the clutch 24 closed.

Figure 3:
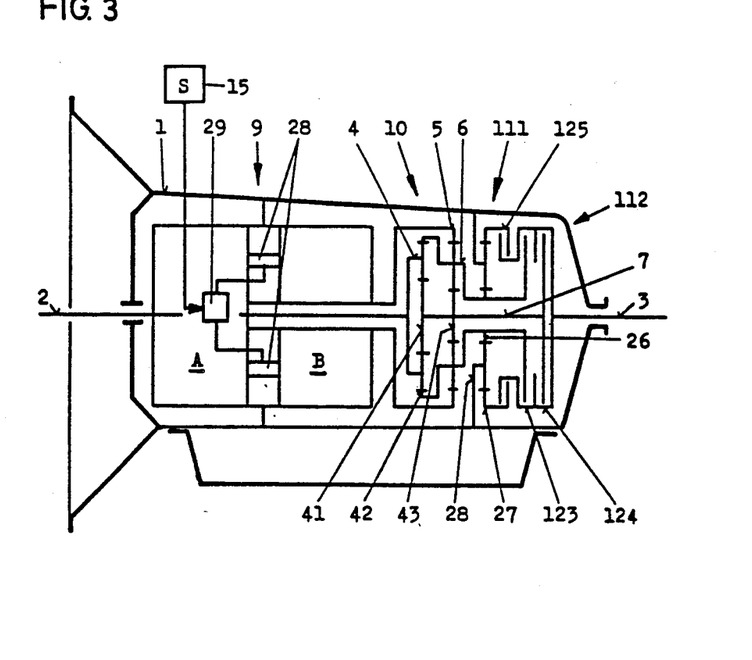
FIG. 3 shows one embodiment with two hydromechanical forward ranges and one hydromechanical reverse range.

The embodiment according to FIG. 3 differs from embodiment 1 mainly in that across all gear-shift ranges the power is transmitted purely hydromechanically, and that there are two, instead of three, forward ranges. The power flow corresponds to the power flow in the embodiment depicted in FIG. 1 within the two hydromechanical ranges. In accordance with the speed diagram shown in FIG. 4, when designing the transmission or the summation planetary gear train 10, the hydrostatic unit, during startup and at "zero" driving speed, is set at its full negative value of adjustment. If the summation planetary gear train 10 is designed according to the speed diagram shown in FIG. 5, the hydrostatic transmission, at startup, is also set at its full maximum volume of adjustment, but with the difference that the speed range of the second hydrostatic unit B is expanded, i.e., that the speed of the hydrostatic unit B, at starting point "zero", is substantially higher than that of the first hydrostatic unit A, despite equal pumping or displacement volumes under these operating conditions. At this operating point, the second hydrostatic unit B, with the first range clutch 123 closed, is driven via the internal gear 5 of the summation planetary gear train, and thus operates as a pump. Due to the lower speed, the resulting quantity delivered by the hydrostatic unit B is larger than the hydrostatic unit A can accommodate. The increased delivery is routed to the low-pressure side or the suction side via a bypass valve 29 connected between the two operating-pressure lines 28 of the hydrostatic transmission 9. During startup, this bypass valve 29 is closed gradually by a signal S, thereby causing the input shaft to rotate to a some degree. With the bypass valve closed, the two hydrostatic units A and B have identical speeds, but in opposite directions of rotation, as shown in the speed diagram of FIG. 5 at the transmission-ratio point X. This corresponds to a certain minimum travelling speed of the vehicle, e.g., the travelling speed in the first gear of a conventional transmission. Because of the expansion of the speed of the second hydrostatic unit B, which, according to the speed diagram in FIG. 5, corresponds to a value of $-1.3$ versus the maximum value of the unit A, a considerable increase in the transmission ratio or in the gear-shift range results.

Figure 5:
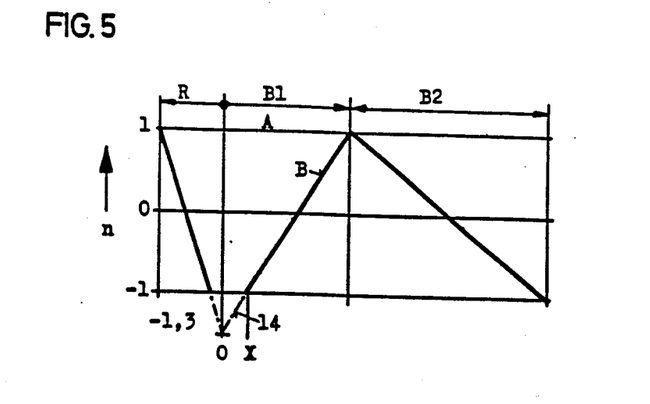
FIG. 5 shows a speed diagram for the embodiment of FIG. 3, but with expanded first forward range and expanded reverse range.
Figure 5A:
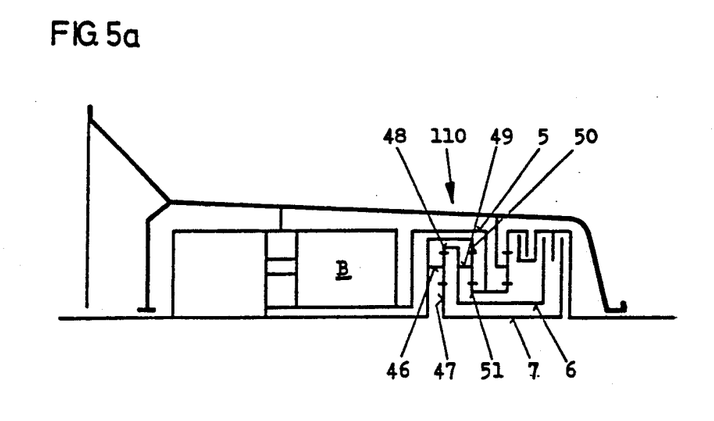
FIG. 5a shows an embodiment of the summation planetary gear, in particular for a transmission design with expanded first forward range and expanded reverse range.

FIG. 5a shows a summation planetary gear train 110, which enables the transmission-ratio point X to be raised to approximately one-third of the transmission ratio of the entire first range. In this way, one can increase the efficiency or the marginal power of the transmission up to 30%. Furthermore, it is possible to obtain a very spontaneous accelerating ability in the lowest speed range which is especially advantageous in passenger cars. The designs of the two summation planetary gear trains shown in FIGS. 5a and 3 offer the advantage of a very cost-effective and efficient production, especially because the individual transmission members: internal gears 48, 50 or 42, 5 and 27, as well as sun gears 47, 51 and 41, 43, 26, can be designed with the same numbers of teeth. The summation planetary gear train 10 is to be preferred for a fairly low expansion of the range, while the summation planetary gear train 110 is to be preferred for a fairly high expansion.

In many cases, the range expansion described herein, particularly in the passenger car field, dispenses with an additional gear-shift range. However, in case of frequent operation in the low-speed range and with high tractive forces, such as when operating a mobile-home vehicle in the mountains, it is advisable to connect on the load side the first hydrostatic range according to the embodiment shown in FIG. 1, which makes infinitely-variable control up to V-O possible, instead of the expansion range.

The transmission design shown in FIG. 3 is particularly distinguished by the fact that it is of very simple construction, that it can be made with or without range expansion, that it has a high power density, allowing for a highly pro-vehicle form of construction, especially for rear-wheel-drive cars, and that it can usually be produced inexpensively, efficiently, and largely without risk. In addition, a large reverse range is provided, as is customary in passenger cars.

In a prior art transmission of this type as taught by German Pat. No. 31 47 447, this speed expansion of the hydrostatic unit's or range expansion is also used, but with the disadvantage that a starting clutch is provided for the bridging of the speed expansion of the hydrostatic unit B, or of the range expansion up to the transmission-ratio point X. However, this prior art starting gear is very expensive and calls for a large amount of installation space.

Figure 2:
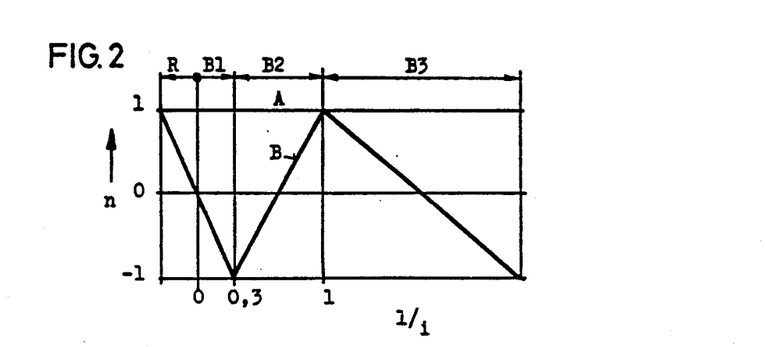
FIG. 2 shows the speed diagram for the embodiment shown in FIG. 1.

The specific embodiments shown in FIGS. 6c, 7, 8 and 9 are identical in transmission principle to the embodiment in FIG. 1 and to the associated speed diagram of FIG. 2. Each has three forward ranges, with the first range and the reverse range operating purely hydrostatically, and the second and third ranges operating hydromechanically, as described earlier. For vehicles with considerable starting tractive forces or with frequent operation in the lowest speed range, which particularly applies to heavy-duty vehicles, such as buses, commercial vehicles, and operator machines, this design is very advantageous.

Figure 4:
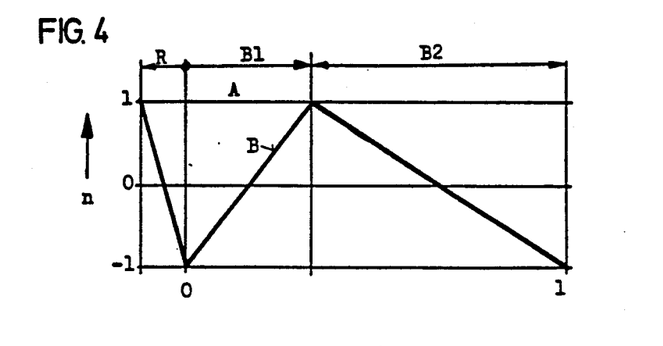
FIG. 4 shows the speed diagram pertaining to the embodiment depicted in FIG. 3.
Figure 6:
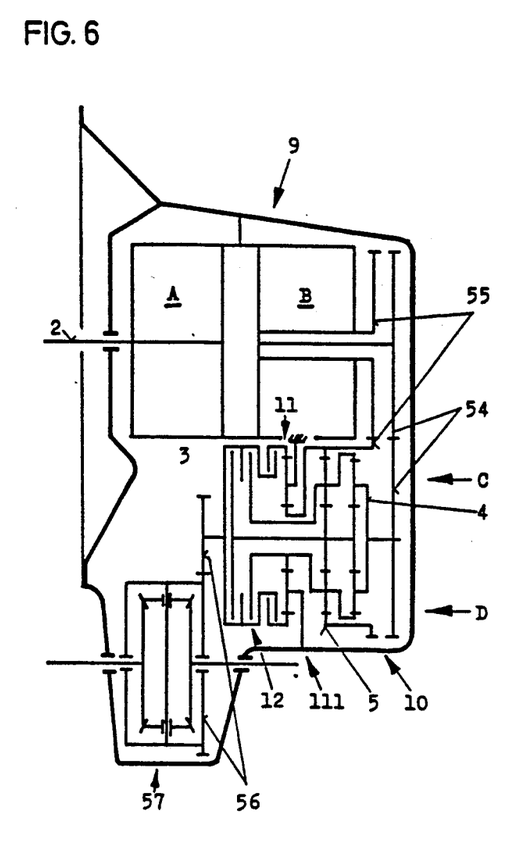
FIG. 6 shows an embodiment of the transmission for the transverse method of construction, especially use in passenger cars.

The specific embodiment depicted in FIG. 6 shows the system in two- and three-range designs in accordance with the speed diagrams shown in FIGS. 2, 4 and 5. This transmission corresponds to the installation requirements of a front-wheel-drive passenger car with transverse-mounted engine. Here, the components of the transmission with multiple transmission-power paths: summation planetary gear train 10, second planetary gear train 11 or 111, and the clutch package 12 are staggered axially parallel to the input shaft and the hydrostatic transmission 9. Via the two spur gear steps 54 and 55, the input shaft A is coupled to the first shaft of the summation planetary gear train, the planet carrier 4, and the second hydrostatic unit B, to the second shaft, the internal gear 5 of the summation planetary gear train. The gear box is also provided with the axle differential for the front-wheel drive, which is connected to the output shaft of the transmission 3 via a spur gear step 56. In this embodiment of the transmission components, it is also possible to transverse-mount the axle differential, e.g., for a front-wheel-drive passenger car with a longitudinally mounted engine, in which the driving connection is made by a bevel gear (not shown) instead of by the spur gear step 56.

Infinitely variable transmission systems known heretofore do not permit such flexibility, or only under very difficult conditions at best.

Figure 7:
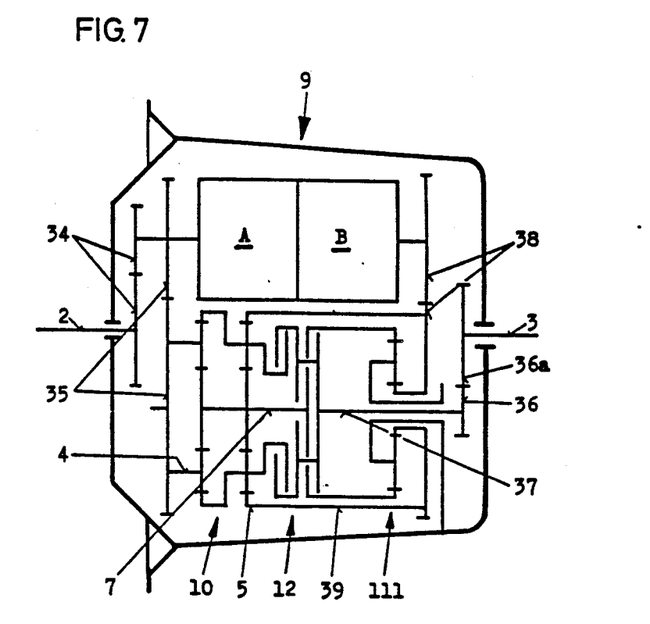
FIG. 7 shows an embodiment with the basic units staggered axially in parallel, e.g., for use in heavy-duty vehicles.

In the embodiment shown in FIG. 7, the transmission components: group of hydrostatic units 9 and the multiple power-transmission paths, summation planetary gear train 10, clutch package 12, and second planetary gear train 111, are staggered axially parallel to each other. In this combination of transmissions, the components of the transmission with multiple power-transmission paths: summation planetary gear train 10, clutch package 12, and second planetary gear train 111, can be combined into one assembly unit. In this case, the clutch package 12 is very advantageously mounted between the summation planetary gear train 10 and the second planetary gear train 111, with the coupling output shaft 37 extending through the second planetary gear train 111 and connected to the output shaft 3 via a spur gear step 36, 36a. The summation planetary gear train 10 is connected directly via its first shaft, planet carrier 4, to the first hydrostatic unit A, and via the spur gear step 34 to the input shaft 2. The second shaft, internal gear 5, is coupled to the output shaft of the second hydrostatic unit B via a hollow shaft 39 and a cylindrical-gear pair 38. The spur gear step 34 on the input end offers the possibility of any desired speed adaptation to different speeds of the drive engine. Moreover, in this combination of transmissions, it is at the same time possible to design the coupling output shaft 37 as the transmission output shaft not shown herein.

Figure 9:
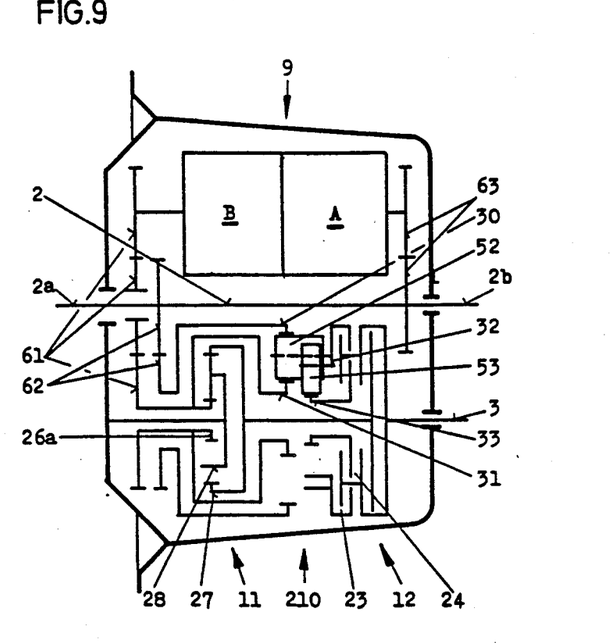
FIG. 9 shows an embodiment with basic units staggered axially to the input shaft, in particular for heavy-duty vehicles.

The transmission design shown in FIG. 9 offers the advantage that the drive may be effected selectively via two opposed shaft ends 2a or 2b, thereby making possible very favorable, vehicle-oriented combinations of engine transmissions not shown. For example, in order to drive buses in which the engine is transverse-mounted in front of, or behind, the driving axle, the transmission can be designed in such a way that the output shaft emerges perpendicularly from the gear box near the engine flange to drive directly into the differential of the driving axle. This is realized in such a manner (not illustrated in the drawings), that the engine connects to the input-shaft connection 2b, and the output shaft 3, which is here on the input end of the transmission, is connected in a manner known from the prior art to a cone-pulley drive that can be integrated into the transmission. Thus, engine and transmission form a very compact and vehicle-oriented drive unit.

The combination of transmissions with multiple power-transmission paths shown in the transmission design in FIG. 9 is characterized by the fact that the summation planetary gear train 210 is mounted between the second planetary gear train 11 and the clutch package 12. The summation planetary gear train 210 consists of two different planet gears 52 and 53 mounted on a planet carrier 32, with the first shaft, internal gear 30, and the second shaft, sun gear 31, meshing with the planet gear 52, the planet carrier 32 forming the third shaft of the summation planetary gear train, and the fourth shaft engaging as sun gear 33 the planet gear 53. Via the spur gear step 62, the input shaft 2 is connected to the first shaft 30 of the summation planetary gear train and, via the spur gear step 61, the second hydrostatic unit B is connected to the second shaft, the sun gear 31 of the summation planetary gear train, and the sun gear 26a is connected to the second planetary gear step 11. The first hydrostatic unit A is coupled to the input shaft 2 via the spur gear step 63.

The continuous input shaft 2 of the transmission design shown in FIG. 9 offers the further advantage, especially when applied to operator machines, in particular tractors, that it is possible to connect to the shaft end 2b the output shaft, as well as secondary drives or output drives.

Figure 8:
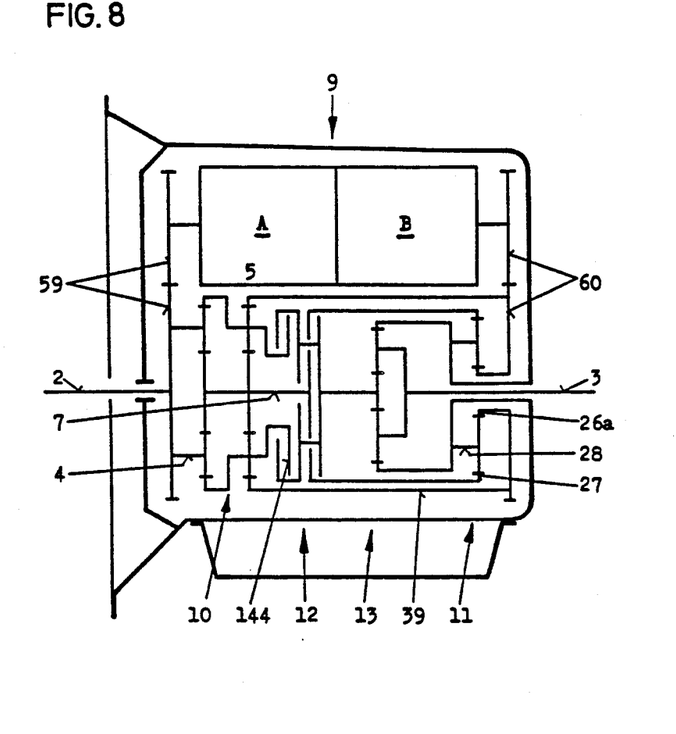
FIG. 8 shows an embodiment with coaxial arrangement of the components of a transmission with multiple power-transmission paths and a hydrostatic transmission 9 staggered in parallel.

The transmission designs shown in FIGS. 7, 8 and 9 can also be constructed as two-range transmissions in accordance with the speed diagrams in FIGS. 4 and 5.

Figure 10:
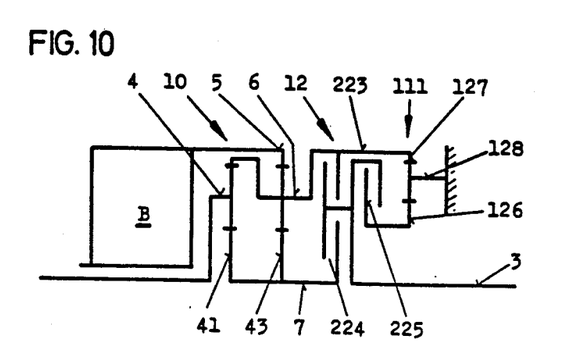
FIG. 10 shows an embodiment and an arrangement of the components of the transmission with multiple power-transmission paths: summation planetary gear train 10, clutch package 12, and second planetary gear train 111.

FIG. 10 shows a combination of transmissions for a two-range transmission, i.e., with two hydromechanical forward ranges and one hydromechanical reverse range. Here, the summation planetary gear train 10 is connected with its third shaft, the planet carrier 6, to the internal gear 127 of the second planetary gear train step 111. The second planetary gear train step 111 is mounted on the output end of the transmission. The sun gear 126 of the second planetary gear train 111 can be connected to the output shaft 3 via the clutch 225. Thus, the clutch package 12 is located between the summation planetary gear train 10 and the second planetary gear train 111. This form of construction is particularly advantageous for vehicles which requires reverse speeds that are relatively high in relation to the forward speed, which applies, for instance, to operator machines, such as tractors and wheel bearings.

As illustrated in all of the specific embodiments, this transmission system is distinguished by its great flexibility with respect to a variety of installation conditions and to the operating conditions by selective design as a two-range transmission with and without range expansion, or as a three-range transmission. From the technical point of view, the individual modules and components are easy to produce and can very advantageously be combined into individual modules as part of a modular method of construction for ease of assembly and service.

We claim:

1. An infinitely variable hydromechanical transmission mechanism having a power input shaft, a power output shaft and multiple path power-transmission means for transmitting power in at least two speed ranges from said input shaft to said output shaft, said transmission mechanism comprising:

hydrostatic drive means connected to said power input shaft and comprising a first hydrostatic unit and a second hydrostatic unit having a hydrostatic power outlet;

a four-shaft summation planetary gear train having a first shaft connected to the input shaft, a second shaft connected in constant driving relationship to the hydrostatic power outlet, a third shaft and a fourth shaft;

first clutch means for selectively drivingly connecting said third shaft and the output shaft;

second clutch means for selectively drivingly connecting said fourth shaft and the output shaft; and a three-shaft planetary gear train having a shaft that is connected to either the second shaft or the third shaft of the four-shaft planetary gear train.

2. A transmission mechanism as set forth in claim 1, wherein the hydrostatic drive means has at least two operating-pressure lines which interconnect the units thereof, said transmission mechanism further comprising a bypass valve connected between said operating-pressure lines.

3. A transmission mechanism as set forth in claim 2, wherein is provided bypass means for activating said control valve in response to an operational condition of the transmission mechanism.

4. A transmission mechanism as set forth in claim 2, wherein the four-shaft summation gear train is designed such that when the bypass valve is closed and the transmission mechanism is shifted into its lowest speed range, a transmission ratio is established to correspond to a predetermined minimum output shaft speed.

5. A transmission mechanism as set forth in claim 1, wherein the four-shaft summation planetary gear train comprises first and second planetary gear train steps, each said planetary gear train step including a planet carrier, an internal gear and a sun gear, the first shaft of the summation planetary gear train being connected to the planet carrier of the first planetary gear train step and to the internal gear of the second planetary gear train step, the second shaft being connected to the sun gear of the second planetary gear step, the third shaft being connected both to the planet carrier of the second planetary gear train step and to the internal gear of the first planetary gear train step, and the fourth shaft being drivingly connected to the sun gear of the first planetary gear step.

6. A transmission mechanism as set forth in claim 1, wherein the summation gear train comprises a double planetary gear train having two intermeshed planet gears, the first shaft including an internal gear, the second shaft including a sun gear, the third shaft including a planet carrier mounting the intermeshed planet gears and the fourth shaft including a sun gear, one of the intermeshed planet gears being in operable engagement with both the internal gear of the first shaft and the sun gear of the second shaft, the other of the intermeshed planet gears being in operable engagement with the sun gear of the fourth shaft.

7. A transmission mechanism as set forth in claim 1, wherein all the gears of both the four-shaft summation planetary gear train and the three-shaft planetary gear train have the same number of teeth.

8. A transmission mechanism as set forth in claim 1, wherein the first and second clutch means are arranged in a compact clutch package and the four-shaft gear train, the clutch package and the three-shaft gear train are disposed in alignment, the hydrostatic transmission being disposed in laterally spaced relationship relative to the aligned gear trains and clutch package.

9. A transmission mechanism as set forth in claim 1, wherein the first and second clutch means and the gear trains are arranged in concentric relationship to thereby present a common axis, and said four-shaft gear train, said first and second clutch means and said three-shaft gear train are disposed in side-by-side relationship along the common axis.

10. A transmission mechanism as set forth in claim 1, wherein the first and second clutch means are arranged in a compact clutch package and the hydrostatic drive means, the four-shaft gear train and the clutch package are arranged in concentric relationship.

11. A transmission mechanism as set forth in claim 1, wherein the first and second clutch means are arranged in a compact clutch package and the hydrostatic drive means is mounted concentrically with respect to the axis of rotation of the input shaft, the four-shaft planetary gear train, the three-shaft planetary gear train and the clutch package being disposed in laterally offset, parallel relationship relative to said axis, said mechanism including a first spur gear step connecting the input shaft to the first shaft of the summation planetary gear train and a second spur gear step connecting the second hydrostatic unit to the second shaft of the summation planetary gear train.

12. A transmission mechanism as set forth in claim 1, wherein the hydrostatic drive means is offset axially relative to the other components of the transmission mechanism, a first spur gear being provided for drivingly connecting the input shaft and the hydrostatic drive means and a second spur gear step being provided for drivingly connecting the input shaft and the four-shaft summation planetary gear train.

13. A transmission mechanism as set forth in claim 1, wherein an additional planetary gear train is included for modifying the output speed of the mechanism.

14. A transmission mechanism as set forth in claim 1, wherein the input shaft is elongated and disposed in offset, parallel relationship relative to the hydrostatic drive means and the other components of the transmission mechanism, said input shaft being provided with a respective drive connection at each of its ends.

15. A transmission mechanism as set forth in claim 1, wherein the three-shaft planetary gear train includes an internal gear and a sun gear, the third shaft of the summation planetary gear train is connected to the internal gear of the three-shaft planetary gear train, and a third clutch means is provided for selectively connecting the sun gear of the three-shaft gear train and the output shaft.

16. An infinitely variable hydromechanical transmission mechanism having a power input shaft, a power output shaft and multiple path power transmission means for transmitting power from said input shaft to said output shaft, said mechanism comprising:

hydraulic drive means including a first hydrostatic unit with adjustable volume and a second hydrostatic unit having a hydrostatic power outlet;

a four-shaft summation planetary train for adding together hydraulic and mechanical power and having first, second, third and fourth shafts, said input shaft being permanently drivingly connected to the hydrostatic drive unit and to the first shaft of the four-shaft gear train and said second shaft being permanently connected to the hydrostatic power outlet;

a three-shaft planetary gear having a shaft that is connected to either the second shaft or the third shaft of the summation gear train; and at least two clutches for selectively and alternatively connecting said third and fourth shafts to the output shaft.

17. A transmission mechanism as set forth in claim 16, wherein said clutches are arranged in a common clutch assembly mounted between the summation gear train and the output shaft.

* * * * *